Oct. 27, 1942.    H. E. McWANE    2,300,034
MOLD AND PROCESS OF MANUFACTURE
Filed June 29, 1939

— Commercially pure Copper
— Molecular Contact
— Welded Bronze

— Electrolytic Iron
— Molecular Contact
— Welded Steel or Iron

— Electrolytic Iron
— Molecular Contact
— Welded Bronze

— Silver
— Molecular Contact
— Metal less subject to Warpage than Silver

Inventor
HENRY E. McWANE
By Semmes, Keegin & Semmes
Attorneys

Patented Oct. 27, 1942

2,300,034

UNITED STATES PATENT OFFICE 2,300,034

MOLD AND PROCESS OF MANUFACTURE

Henry E. McWane, Lynchburg, Va.

Application June 29, 1939, Serial No. 281,971

6 Claims. (Cl. 22—136)

My invention relates to metallic molds, and in particular to the manufacture of metallic molds for casting metal articles.

An object of my invention is to provide a process for the manufacture of metallic molds which will enable them to be used over a long period without undue warpage, heat checking or other deterioration.

Another object of my invention is to provide a metallic mold which is sturdy, adapted to be used for long periods of time, and which is not expensive to manufacture and easy to repair.

My invention comprises both the process and the article itself, and in general comprises the strong attachment of a ductile mold face to a strengthening backing. The property of the mold face must be such that it will not heat check under many heatings and coolings. In general the property of ductility determines this resistance to heat checking, but I do not wish to be limited to a strict definition of the term "ductile," so long as the mold face possesses the property of continued use without heat checking.

In general the mold face should be of a highly conductive metal since it is desirable that the articles cast have some of the properties which are imparted by a chill casting. It has been found that where a mold is used in which the metal has the property of resisting heat checking, the mold will warp, and it is expensive to spot the mold to keep it in condition for a long period of use.

I have found that by intimately attaching a backing to the warpable mold face which prevents warping, I have greatly increased the life of the mold.

Other objects will be apparent from the ensuing description.

Figure 1:
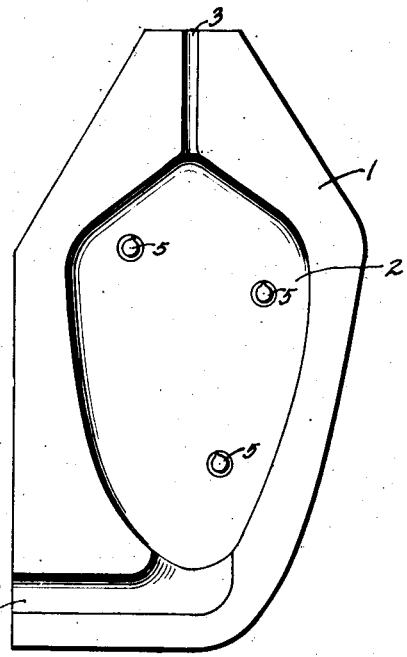
Figure 1 is a top plan view of a mold made in accordance with my invention.

Referring to the drawing, I have shown in Fig. 1, a mold half which comprises a face 1 having a mold cavity 2 therein, a vent hole 3 and a channel 4 through which the molten material is poured into the interior of the mold. It has a complemental half which fits thereover, and which completes the mold cavity, the vent hole and the filling channel. Within the mold cavity 2 are provided cores 5.

Figure 2:
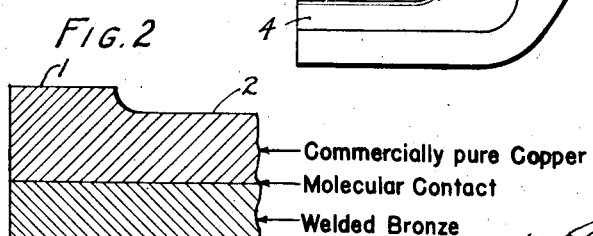
Fig. 2 is a sectional view of one type of mold which I may employ.

The mold face 1 is adapted to be made of commercially pure of so-called "prime" copper to which is attached, by welding, a bronze back 6. There is between the mold face 1 and the bronze backing 6 a molecular contact which is caused by welding the bronze to the electrolytic copper. As illustrated in Fig. 2, the line of molecular contact is in effect a zone of alloy. Wherever in the drawing the mold face and backing are shown to be in molecular contact, there is in effect an alloy formed at this line of juncture.

It is necessary that there be this molecular contact between the mold face and the backing so as to provide ready heat exchange between the mold face and the back, and also the intimate joining of the back and the face is necessary to prevent warping of the face.

In the form of mold shown in Figs. 1 and 2, the copper is soft and ductile and of high heat conductivity. The copper has the property of resisting heat checking through many periods of heating and cooling, such as occur when the mold is in constant use casting metallic articles, such, for instance, as plow points, moldboards for plows, or any other metallic article which is the subject of the molding operation.

Were it not for the welded bronze which forms the backing the ductile copper face would readily warp out of shape after a short period of use. The welded bronze which forms the backing, however, prevents in a large measure the warping of the material of the face.

Figure 6:
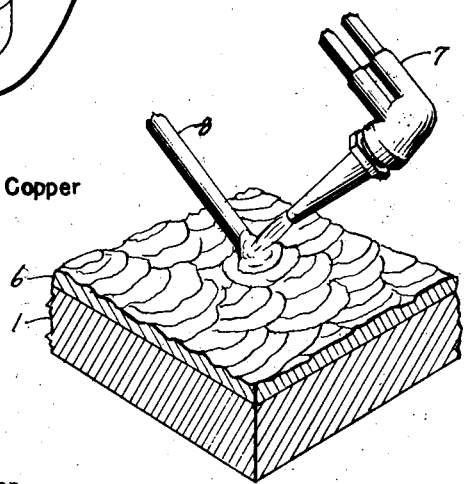
Fig. 6 is a perspective view showing the back of the mold in the process of being built up by welding the backing metal to the mold face.

The welded bronze backing 6 is built up by welding pieces of the bronze to the face. This is shown in Fig. 6, wherein a welding torch 7 is shown melting a rod 8 of bronze. The end of the rod 8 of bronze is welded to the copper face 1 and the back is gradually built up, as indicated in the drawing. It is best in this welding operation to carry on the operation at one time until all of the welded backing is in place, as if the entire structure is allowed to cool and the welding is started over again the strains set up tend to cause separation of the backing from the mold face.

By repeated applications of small particles of the metal to the back, the desired thickness of the backing can be obtained. The thickness desired is that which is sufficient to prevent warping of the metal of the face. Some warping may occur even with the bronze backing, but this is very small and the face can be "spotted" to take care of slight irregularities in the mold itself which may occur through long periods of use.

If the bronze backing were not in place, the mold face would warp so rapidly that the "spotting" of the mold face would be an exceedingly expensive proposition which would have to be often repeated in order to enable the mold to be used.

Though I have shown in Figs. 1 and 2 a form of construction in which a commercially pure, or "prime," copper face has welded to it a bronze backing, it is to be understood that other face material and backing material may be used. For instance, silver may form the face and a backing may be welded to the silver. The silver has a high conductivity which is desirable to effect the chill of the casting. Moreover the silver is highly ductile and possesses the property of resisting heat checking through repeated heatings and coolings. A back of a metal which is not easily warped under repeated heating and cooling welded to the silver prevents undue warpage of the mold face.

Figure 3:
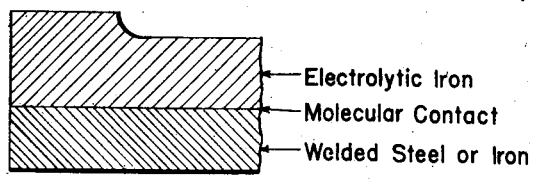
Fig. 3 is a sectional view of another type of mold which I may employ.

In Fig. 3 I have shown a mold face made of electrolytic iron, to which is welded a backing of steel or iron.

Another form of my invention shows an electrolytic iron face to which is welded a backing of bronze.

Figure 4:
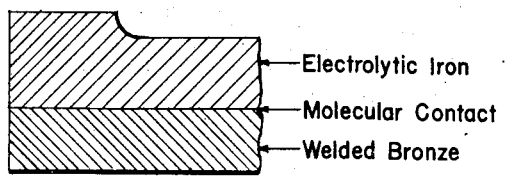
Fig. 4 is a cross-sectional view of yet another alternate type of mold which I may use.

The electrolytic iron shown in Figs. 3 and 4 resists heat checking to a high degree, is ductile, and has a sufficiently high degree of conductivity to give the desirable chill to the casting. The conductivity of the electrolytic iron has in some instances been found to be not so great as the electrolytic copper. Nevertheless desirable results may be obtained by the use of an electrolytic iron face.

Figure 5:
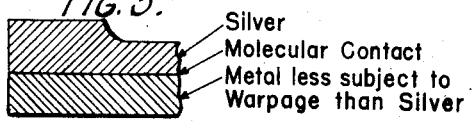
Fig. 5 is a view in cross section of an alternate type of mold.

In Fig. 5 is shown a form of mold where the mold face is made from silver. The backing may be of bronze or any other metal that is less subject to warpage than the mold face under the repeated heating and coolings of operation.

Silver is resistant to heat checking under operating conditions.

It is my desire that my invention cover equivalents within the meaning of the patent law, and that the invention be limited no further than it may be limited by the terms of the appended claims.

I claim:

1. A method of forming a mold comprising forming a mold cavity and then building up the backing therefor by welding relatively small pieces of backing metal thereon, and continuing this building up process until the backing is of the desired thickness.

2. A method of forming a mold comprising forming a mold cavity of metal highly resistant to checking under repeated heating and cooling, and then building up a backing therefor and continuing this building up process until the backing is of the desired thickness, the metal of the backing being of a type which is of greater resistance to warping under repeated heating and cooling than is the metal of the cavity.

3. A mold comprising a mold cavity of metal highly resistant to checking under repeated heating and cooling, and a backing therefor, and welded thereto, of a metal which is resistant to warping under repeated heating and cooling, said backing being built up from relatively small particles of metal welded on the cavity, and built up into a back of the required thickness.

4. A mold comprising a mold cavity of copper, and a backing built up from relatively small particles of bronze welded on the cavity and built up into a back of the required thickness.

5. A mold comprising a mold cavity of electrolytic iron, and a backing built up from relatively small particles of ferrous metal welded on the cavity and built up into a back of the required thickness.

6. A mold comprising a mold cavity of electrolytic iron, and a backing built up from relatively small particles of bronze welded on the cavity and built up into a back of the required thickness.

HENRY E. McWANE.